US012548901B2

(12) United States Patent
Wu et al.

(10) Patent No.: US 12,548,901 B2
(45) Date of Patent: Feb. 10, 2026

(54) ELECTRONIC DEVICE

(71) Applicant: PEGATRON CORPORATION, Taipei (TW)

(72) Inventors: Chien-Yi Wu, Taipei (TW); Chao-Hsu Wu, Taipei (TW); Hau Yuen Tan, Taipei (TW); Chih-Wei Liao, Taipei (TW); Hao-Hsiang Yang, Taipei (TW); Shih-Keng Huang, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 51 days.

(21) Appl. No.: 18/791,304

(22) Filed: Jul. 31, 2024

(65) Prior Publication Data

US 2025/0183535 A1 Jun. 5, 2025

(30) Foreign Application Priority Data

Nov. 30, 2023 (TW) ................................ 112146655

(51) Int. Cl.

| | |
|---|---|
| ***H01Q 5/25*** | (2015.01) |
| ***H01Q 1/38*** | (2006.01) |
| ***H01Q 5/10*** | (2015.01) |
| ***H01Q 9/30*** | (2006.01) |

(52) U.S. Cl.

CPC ................ *H01Q 5/25* (2015.01); *H01Q 1/38* (2013.01); *H01Q 5/10* (2015.01); *H01Q 9/30* (2013.01)

(58) Field of Classification Search

CPC ...... H01Q 1/2266; H01Q 1/243; H01Q 5/364; H01Q 7/00

See application file for complete search history.

(56) References Cited

U.S. PATENT DOCUMENTS

| | | | | |
|---|---|---|---|---|
| 2023/0402767 | A1* | 12/2023 | Wu | H01Q 21/30 |
| 2024/0145919 | A1* | 5/2024 | Wu | H01Q 1/243 |

FOREIGN PATENT DOCUMENTS

| | | |
|---|---|---|
| CN | 215220984 | 12/2021 |
| TW | M578476 | 5/2019 |
| TW | 202032850 | 9/2020 |
| TW | 202147691 | 12/2021 |
| TW | 202324836 | 6/2023 |

* cited by examiner

*Primary Examiner* — Daniel Munoz
(74) *Attorney, Agent, or Firm* — J.C. PATENTS

(57) ABSTRACT

An electronic device includes a metal side wall, a first radiator, and a second radiator. The metal side wall has a first slot including an opening end and a closed end. The closed end is disposed on the metal side wall. The opening end extends to an upper edge of the metal side wall to disconnect the upper edge. The first radiator is apart from the metal side wall, and includes a first end and a second end. The first end is a feeding end. The second end is connected to the upper edge of the metal side wall. The second radiator is apart from the metal side wall, and includes a third end and a fourth end. The third end is connected to the upper edge of the metal side wall. The opening end of the first slot is located between the second end and the third end.

10 Claims, 8 Drawing Sheets

ELECTRONIC DEVICE

CROSS-REFERENCE TO RELATED APPLICATION

This application claims the priority benefit of Taiwan application serial no. 112146655, filed on Nov. 30, 2023. The entirety of the above-mentioned patent application is hereby incorporated by reference herein and made a part of this specification.

BACKGROUND

Technical Field

The disclosure relates to an electronic device, and in particular to an electronic device capable of resonating at multiple frequency bands.

Description of Related Art

In order to pursue good appearance, texture, and light weight, conventional electronic devices use metal cases. How to dispose an antenna that can resonate at multiple frequency bands on an electronic device with a metal case is a research goal of those skilled in the art.

SUMMARY

The disclosure provides an electronic device whose first radiator and second radiator are connected to a metal side wall, and the metal side wall serves as a part of an antenna loop path and can resonate at multiple frequency bands.

The electronic device of the disclosure includes a metal side wall, a first radiator, and a second radiator. The metal side wall has a first slot. The first slot includes an opening end and a closed end. The closed end is located on the metal side wall. The opening end extends to an upper edge of the metal side wall to disconnect the upper edge. The first radiator is apart from the metal side wall and includes a first end and a second end. The first end is a feeding end, and the second end is connected to the upper edge of the metal side wall. The second radiator is apart from the metal side wall and includes a third end and a fourth end. The third end is connected to the upper edge of the metal side wall. The opening end of the first slot is located between the second end and the third end. The first radiator, a portion of the upper edge between the second end and the opening end, a portion of the metal side wall surrounding the first slot, and the second radiator form an antenna loop path, and the antenna loop path resonates at a first frequency band and a second frequency band.

In an embodiment of the disclosure, a second slot is formed between a portion of the first radiator near the first end and a portion of the second radiator near the fourth end.

In an embodiment of the disclosure, a third slot is formed between the first radiator and the upper edge.

In an embodiment of the disclosure, the antenna loop path is ¾ times a wavelength of the first frequency band.

In an embodiment of the disclosure, the second radiator resonates at a third frequency band, and a length of the second radiator is ¼ times a wavelength of the third frequency band.

In an embodiment of the disclosure, the first frequency band is between 2400 MHz and 2484 MHz, the second frequency band is between 4500 MHz and 5500 MHz, and the third frequency band is between 6000 MHz and 7000 MHz.

In an embodiment of the disclosure, the first slot has a first section and a second section connected to each other, the opening end is located at the first section, the closed end is located at the second section, and a projection of the first radiator or the second radiator onto the metal side wall and the second section of the first slot are staggered.

In an embodiment of the disclosure, the electronic device further includes multiple insulating members disposed in the second section at intervals to form multiple of air outlets.

In an embodiment of the disclosure, the first section is perpendicular to the second section, so that the first slot is in an L shape or a T shape.

In an embodiment of the disclosure, the electronic device further includes a circuit board. The first radiator and the second radiator are disposed on the circuit board. The circuit board includes a first part and a second part connected to each other, the first part is connected to the upper edge of the metal side wall, and the second part is located next to the metal side wall and apart from the metal side wall.

Based on the above, the metal side wall of the electronic device of the disclosure has the first slot, and the second end of the first radiator and the third end of the second radiator are connected to the upper edge of the metal side wall. The first radiator, the portion of the upper edge between the second end and the opening end, and the portion of the metal side wall surrounding the first slot, and the second radiator form the antenna loop path. The antenna loop path resonates at the first frequency band and the second frequency band. Through the aforementioned design, the antenna loop path of the electronic device of the disclosure includes the part of the metal side wall, and can resonate at the frequency bands with good performance.

DESCRIPTION OF THE EMBODIMENTS

Figure 1:
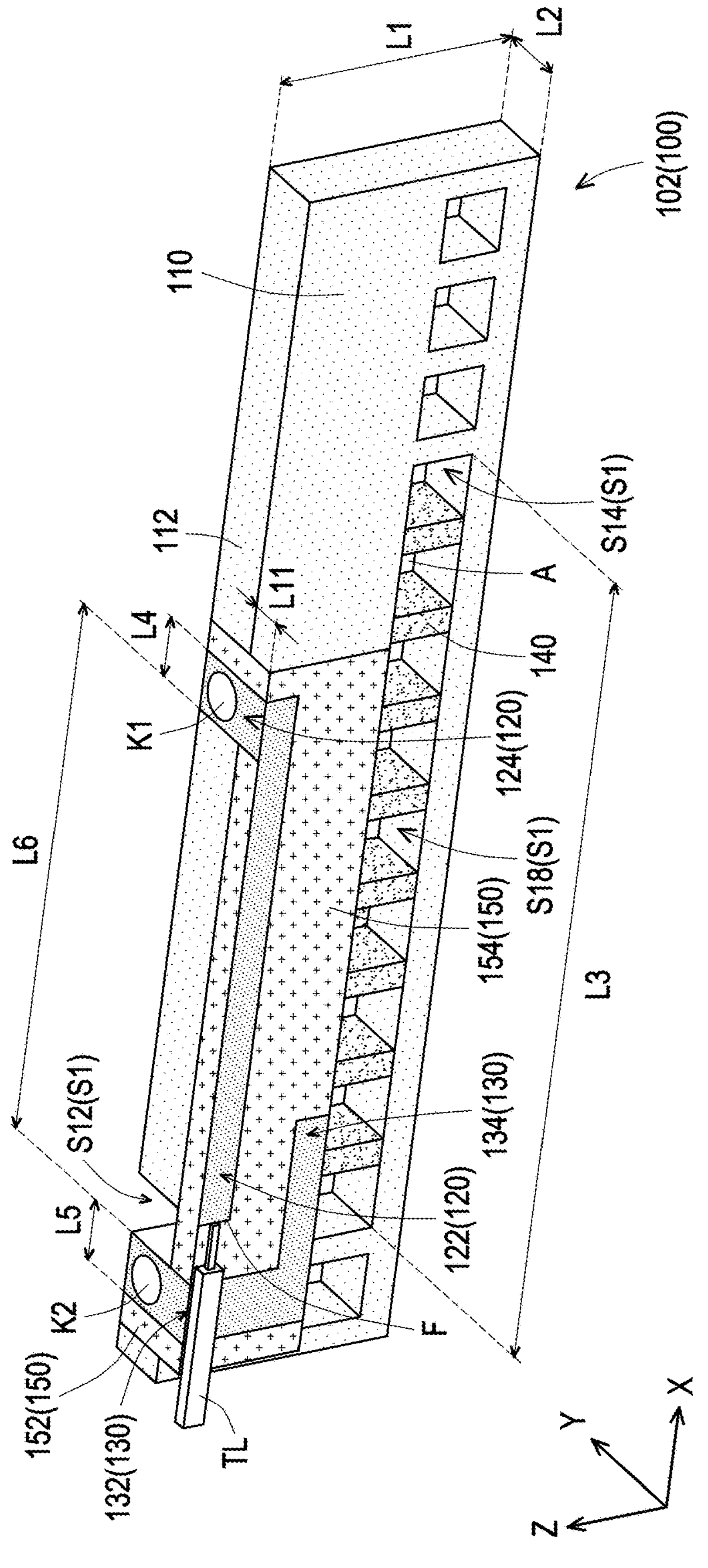
FIG. 1 is a schematic partial view of an electronic device according to an embodiment of the disclosure.
Figure 2:
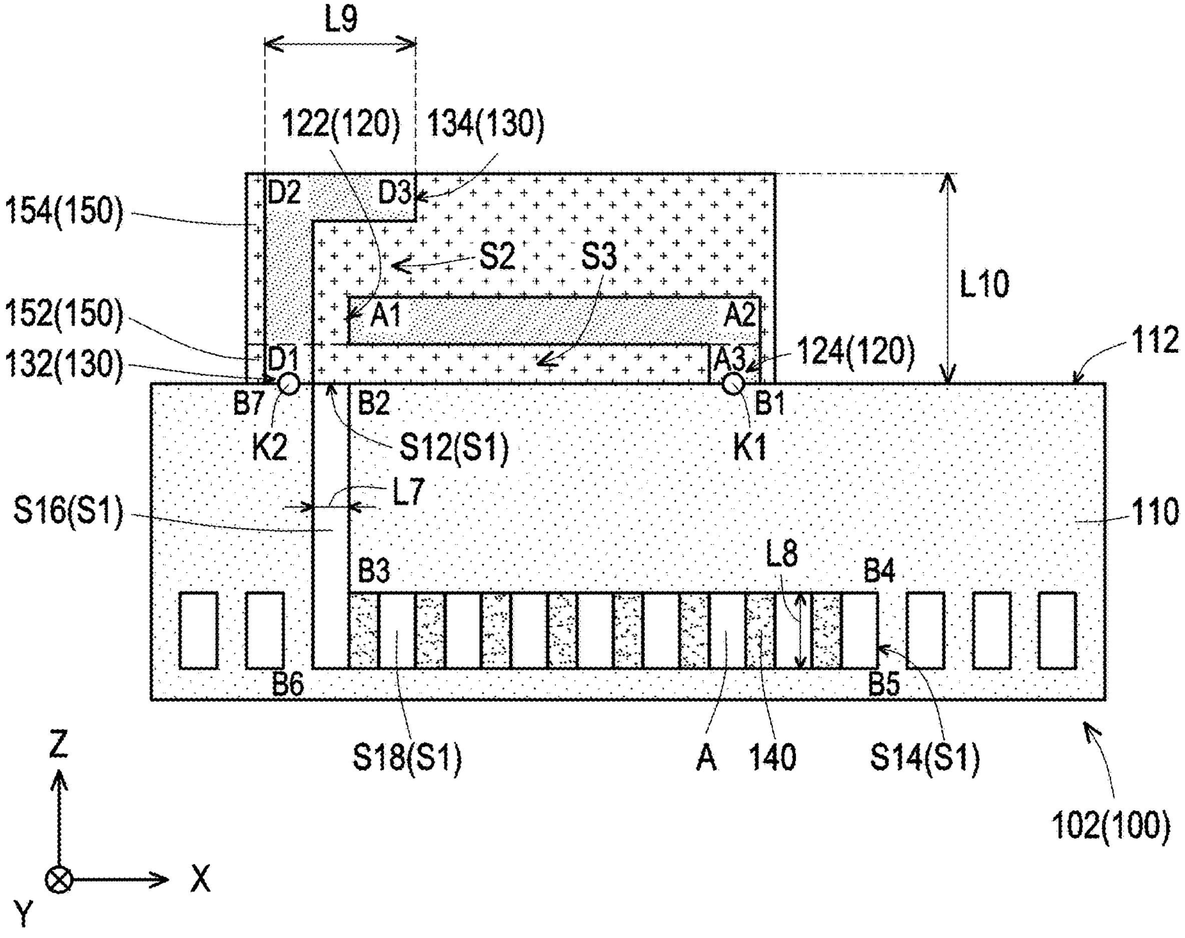
FIG. 2 is a schematic two-dimensional expanded view of a circuit board of the electronic device in FIG. 1.
Figure 3:
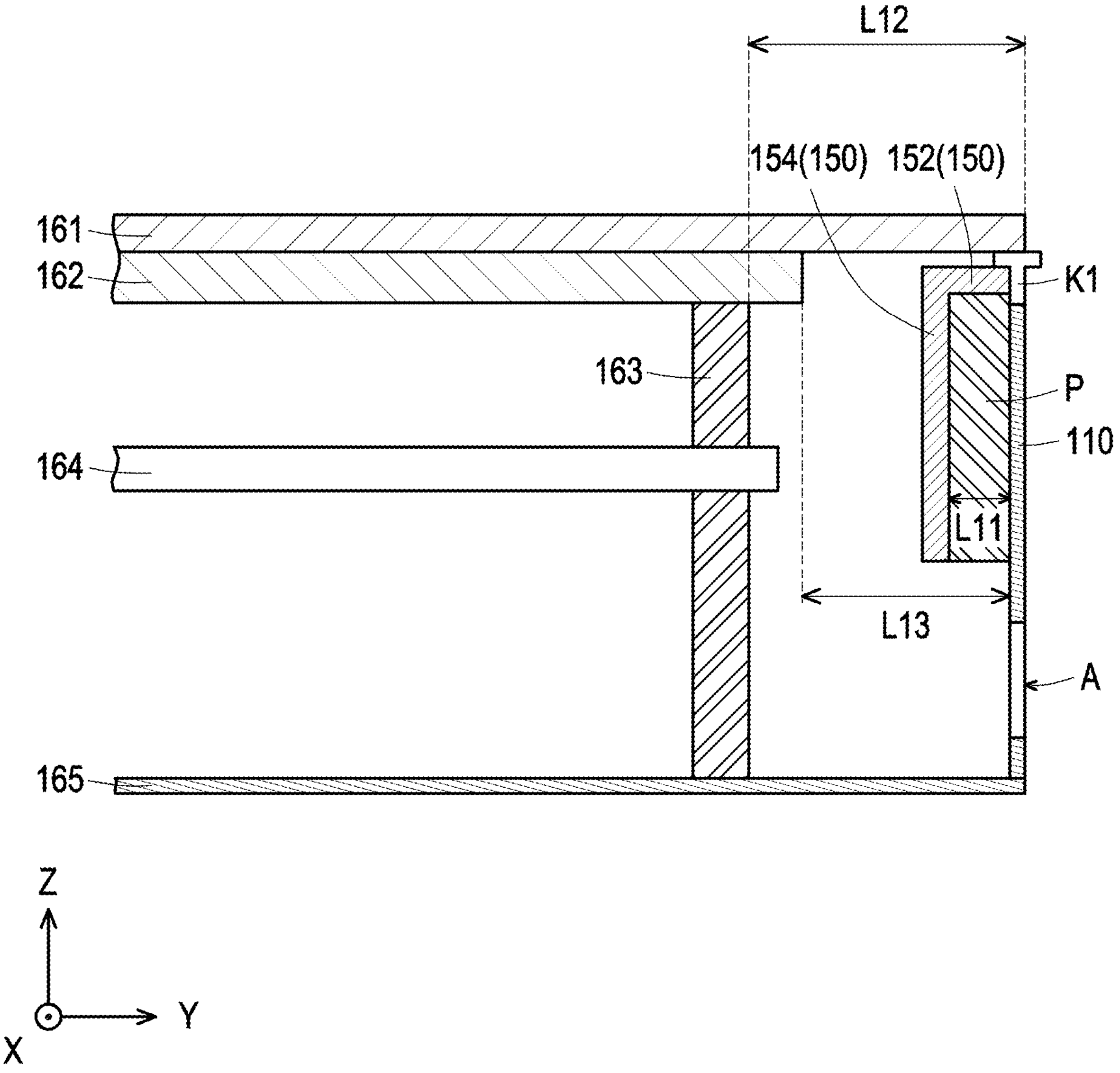
FIG. 3 is a schematic cross-sectional view of the electronic device in FIG. 1.

FIG. 1 is a schematic partial view of an electronic device according to an embodiment of the disclosure. FIG. 2 is a schematic two-dimensional expanded view of a circuit board of the electronic device in FIG. 1. It should be noted that a metal side wall 110 shown in an electronic device 100 in FIG. 1 is, for example, a part of a case of a tablet computer or a notebook computer, and other elements, such as a touch cover board 161, a touch display module 162, a metal retaining wall 163, a master circuit board 164, a metal back cover 165, and other elements in FIG. 3 are omitted.

Referring to FIG. 1 and FIG. 2, in this embodiment, the metal side wall 110 of the electronic device 100 is, for example, a part of the case of the tablet computer or the notebook computer. That is, the electronic device 100 is, for example, the tablet computer or the notebook computer, but the type of the electronic device 100 is not limited thereto.

In this embodiment, the electronic device 100 includes the metal side wall 110. The metal side wall 110 has a first slot S1 (an area surrounded by positions B2 to B7 in FIG. 2), and the first slot S1 includes an opening end S12 and a closed end S14. The opening end S12 extends to an upper edge 112 of the metal side wall 110 to disconnect the upper edge 112. The closed end S14 is located on the metal side wall 110. In this embodiment, a height L1 (see FIG. 1) and a width L2 (see FIG. 1) of the metal side wall 110 are, for example, 8 mm and 2 mm respectively.

The first radiator 120, the second radiator 130, and a circuit board 150 in FIG. 2 are the first radiator 120 and the second radiator 120 in the side view of FIG. 1 flipped 180 degrees along an X-axis, in order to clearly show an antenna loop path formed by a first radiator 120, a second radiator 130, and the first slot S1. In addition, a coaxial transmission line TL (shown in FIG. 1) is omitted in FIG. 2.

In detail, referring to FIG. 2, the first slot S1 has a first section S16 (an area surrounded by positions B2, B3, B6, and B7 in FIG. 2) and a second section S18 (an area surrounded by positions B3 to B6 in FIG. 2) connected to each other. The opening end S12 is located at the first section S16, and the closed end S14 is located at the second section S18. That is, the first section S16 touches the upper edge 112 and disconnects the upper edge 112, and the second section S18 is located on the metal side wall 110.

In this embodiment, the first section S16 is, for example, perpendicular to the second section S18, so that the slot S1 is in an L shape, but the disclosure does not limit the shape of the slot S1. In addition, a width L7 of the first section S16 (see FIG. 2) and a width L8 of the second section S18 (see FIG. 2) are both, for example, 2 mm, and a length L3 of the second section S18 (see FIG. 1) is, for example, 26 mm.

The electronic device 100 of this embodiment includes the first radiator 120 (positions A1 to A3 in FIG. 2) and the second radiator 130 (positions D1 to D3 in FIG. 2). The first radiator 120 includes a first end 122 and a second end 124. The first end 122 is a feeding end F, and the second end 124 is connected to the upper edge 112 of the metal side wall 110. In this embodiment, a width L4 of the first radiator 120 is, for example, 3 mm.

The second radiator 130 includes a third end 132 and a fourth end 134. The third end 132 is connected to the upper edge 112 of the metal side wall 110, and the opening end S12 of the first slot S1 is located between the second end 124 and the third end 132. In this embodiment, a width L5 of the second radiator 130 is, for example, 3 mm.

Specifically, the second end 124 of the first radiator 120 and the third end 132 of the second radiator 130 of this embodiment are both connected to the metal side wall 110 by two sides of the first slot S1. There is a distance L6 between the second end 124 of the first radiator 120 and the third end 132 of the second radiator 130. The distance L6 is, for example, 14.5 mm. The third end 132 of the second radiator 130 is disposed closer to the first slot S1.

The appearance of the first radiator 120 is, for example, an inverted L shape (as shown in FIG. 2), and the appearance of the second radiator 130 is, for example, an inverted L shape (as shown in FIG. 2). The first radiator 120 and the second radiator 130 extend, for example, along a width direction (for example, a Z-axis direction) and a length direction (for example, an X-axis direction) of the metal side wall 110. In detail, the first radiator 120 extends along the length direction of the metal side wall 110 from the positions A2 to A1, and the second radiator 130 extends along the length direction of the metal side wall 110 from the positions D2 to D3. The first radiator 120 extends along the width direction of the metal side wall 110 from the positions A3 to A2 and the second radiator 130 extends along the width direction of the metal side wall 110 from the positions D1 to D2. A distance L9 of the second radiator 130 extending along the length direction of the metal side wall 110 from the positions D2 to D3 is, for example, 12.5 mm, and a distance 10 of the second radiator 130 extending along the width of the metal side wall 110 from the positions D1 to D2 is, for example, 6.5 mm. It should be noted that the inverted L-shape referred to here is an L turned upside down, and the opposite inverted L-shape is an L turned upside down and then mirrored.

In addition, a second slot S2 (see FIG. 2) is formed between a portion of the first radiator 120 near the first end 122 and a portion of the second radiator 130 near the fourth end 134. A third slot S3 (see FIG. 2) is formed between the first radiator 120 and the upper edge 112. A width of the second slot S2 is, for example, 2 mm, and a width of the third slot S3 is, for example, 1 mm.

FIG. 3 is a schematic cross-sectional view of the electronic device in FIG. 1. Referring to FIG. 1 to FIG. 3, the electronic device 100 of this embodiment further includes the circuit board 150. The first radiator 120 and the second radiator 130 are disposed on the circuit board 150 and apart from the metal side wall 110. A length, a width, and a thickness of the circuit board 150 are, for example, 24.5 mm, 8.5 mm, and 0.4 mm respectively. According to the embodiment of the disclosure, the circuit board 150 may preferably be a soft circuit board or may be implemented by laser direct structuring (LDS).

As shown in FIG. 1 and FIG. 3, the circuit board 150 is, for example, a flexible circuit board that is bendable and includes a first part 152 and a second part 154 connected to each other, but the disclosure is not limited thereto. The first part 152 is connected to the upper edge 112 of the metal side wall 110, and the second part 154 is located next to the metal side wall 110 and apart from the metal side wall 110. The gap between the second part 154 of the circuit board 150 and the metal side wall 110 may be filled with a plastic structure P (see FIG. 3) to support the circuit board 150. A distance L11 between the second part 154 and the metal side wall 110 is, for example, 1 mm.

In addition, two fasteners K1 and K2 pass through the second end 124 of the first radiator 120, the third end 132 of the second radiator 130, and a corresponding circuit board 150 to fasten the metal side wall 110, so that the second end 124 and the third end 132 are electrically connected to the metal side wall 110. The two fasteners K1 and K2 are, for example, metal screws, but the types of the fasteners K1 and K2 are not limited thereto.

Moreover, signals are fed to a positive electrode of the coaxial transmission line TL from the first end 122 (that is, the feeding end F in FIG. 1) through a LC matching circuit (not shown), and then transmitted to the metal side wall 110 (the position B1 in FIG. 2) through the fastener K1. A negative electrode of the coaxial transmission line TL is electrically connected to the third end 132 (the position D1 in FIG. 2) of the second radiator 130, and is electrically connected to the metal side wall 110 (the position B7 in FIG. 2) through the fastener K2, so that the electronic device 100 has a good grounding environment.

In this embodiment, the first radiator 120 (the positions A1 to A3 in FIG. 2), a portion (the positions B1 to B2 in FIG. 2) of the upper edge 112 between the second end 124 and the opening end S12, and a portion (the positions B2 to B7 in FIG. 2) of the metal side wall 110 surrounding the first slot S1, and the second radiator 130 (the positions D1 to D3 in FIG. 2) may be used as an antenna module 102 to form the antenna loop path similar to an E-type. The antenna loop path resonates at a first frequency band and a second frequency band, and the antenna loop path is ¾ times a wavelength of the first frequency band. The first frequency band is, for example, between 2400 MHz and 2484 MHz. The second frequency band is, for example, between 4500 MHz and 5500 MHz.

In addition, the second radiator 130 (the positions D1 to D3 in FIG. 2) resonates at a third frequency band, and a length of the second radiator 130 is ¼ times a wavelength of the third frequency band. The third frequency band is, for example, between 6000 MHz and 7000 MHz. Therefore, the electronic device 100 of this embodiment can support Wi-Fi 6E/7 frequency band.

In addition, by adjusting the first radiator 120 (the positions A1 to A3 in FIG. 2), the portion (the positions B1 to B2 in FIG. 2) of the upper edge 112 between the second end 124 and the opening end S12, and the length and the width of the portion (the positions B2 to B7 in FIG. 2) of the metal side wall 110 surrounding the first slot S1, the disclosure may adjust the central frequencies and impedance matching of the first frequency band and the second frequency band.

In addition, the disclosure may adjust the central frequencies and impedance matching of the third frequency band by adjusting the width of the second slot S2 and the length and the width of the second radiator 130 (the positions D1 to D3 in FIG. 2).

It is worth mentioning that the electronic device 100 of this embodiment further includes multiple insulating members 140. These insulating members 140 are disposed in the second section S18 of the first slot S1 at intervals to form multiple air outlets A. The insulating member 140 is partially made of, for example, plastic insert molding, but is not limited to thereto.

In addition, as shown in FIG. 1, the projection of the first radiator 120 or the second radiator 130 onto the metal side wall 110 does not overlap or is staggered with the second section S18 of the first slot S1. In other words, the first radiator 120 or the second radiator 130 do not cover the air outlets A formed in the second section S18 to avoid affecting the heat dissipation of other elements (for example, the master circuit board 164 in FIG. 3).

A conventional antenna design is to place the antenna pattern on the circuit board close to a metal slot on the metal case, excite at a resonant frequency band by coupling, and is grounded to the metal back cover by copper foil or aluminum foil. However, such a design requires the antenna pattern to be accurately aligned with the metal slot to achieve good energy matching. In other words, the conventional antenna design is prone to have deviations in the assembly process, causing the matching between the antenna pattern and the metal slot to deviate and affect the radiation frequency and efficiency. In order to achieve a smooth appearance, the metal slots are usually filled with or covered by fillers to be hidden.

In addition, if the monitor is too close to the metal slot, the coupling amount between the antenna pattern and the metal slot is also affected, which makes the antenna impedance matching difficult to control. Therefore, the conventional antenna design is only suitable for disposing on larger frames to keep a certain distance between the monitor and the metal slot.

The circuit board 150 of this embodiment is fastened to the metal side wall 110, and the first radiator 120 and the second radiator 130 on the circuit board 150 are electrically connected to the metal side wall 110. The antenna loop path formed by the first radiator 120 (the positions A1 to A3 in FIG. 2), the portion (the positions B1 to B2 in FIG. 2) of the upper edge 112 between the second end 124 and the opening end S12, and the portion (the positions B2 to B7 in FIG. 2) of the metal side wall 110 surrounding the first slot S1, and the second radiator 130 (the positions D1 to D3 in FIG. 2) resonates at the first frequency band, the second frequency band, and the third frequency band.

In other words, the first radiator 120 and the second radiator 130 of this embodiment do not resonate at the frequency band by coupling to the first slot S1. Instead, the metal side wall 110 is used as a part of the antenna loop path of this embodiment. Therefore, the electronic device 100 of this embodiment is less susceptible to assembly deviations which affect frequencies and effectiveness in each frequency band. The distance between the touch cover 161 (see FIG. 3) and the metal side wall 110 has less influence on frequencies and effectiveness in each frequency band at which is resonated by the antenna loop path. Therefore, the electronic device 100 of this embodiment can be applied to a narrow frame design in which the touch cover 161 is close to the metal side wall 110.

In addition, the second section S18 of the first slot S1 in this embodiment has the air outlets A for heat dissipation channels. That is, the electronic device 100 of this embodiment combines the antenna loop path with the heat dissipation channel to meet demands for resonance frequency bands and heat dissipation at the same time. In terms of appearance, the first section S16 may be filled with or covered by the filler (such as plastic) to maintain the smooth appearance. As the second section S18 for the heat dissipation channel, the air outlet A is not filled with or covered by the filler, so that the channel of the air outlet A is unblocked, and the heat dissipation is maintained. In the electronic device 100 of this embodiment, only the filler of the first section S16 and the insulating member 140 corresponding to the air outlet A are made of non-metallic material, and there is no need to fill or cover the entire first slot S1 with the non-metallic filler. That is, in terms of appearance, the electronic device 100 of this embodiment has less non-metal area but higher metal area, thereby having better appearance consistency.

Furthermore, the electronic device 100 of this embodiment does not adjust impedance matching by passive elements (such as R, L, C elements) or active elements, which can reduce manufacturing costs and production defective rates.

Referring to FIG. 3, the touch display module (TDM) 162, the metal retaining wall 163 (for example, conductive foam), the master circuit board 164, and the metal back cover 165 are, for example, located by the metal side wall 110 and the circuit board 150, with a gap in between in this embodiment, and the touch cover 161 is disposed on the touch display module 162 and the metal side wall 110.

A narrow-frame visible area is, for example, an area from the metal side wall 110 to the metal retaining wall 163. A width L12 of the narrow-frame visible area is, for example, 5 mm. A distance L13 between the metal side wall 110 and the touch display module 162 is, for example, 3 mm. This distance is, for example, available space for the antenna. A distance L11 between the second part 154 of the circuit board 150 and the metal side wall 110 is, for example, 1 mm. That is, the electronic device 100 of this embodiment has a very small width (that is, the aforementioned distance L11), and may be applied to a conventional narrow frame design (a width is 7 mm, for example) or an even narrower frame design. In addition, the circuit board 150 of this embodiment reduces the overall length in the Y direction with bends, thereby increasing available space of the monitor and improving a screen-to-body ratio.

Figure 4:
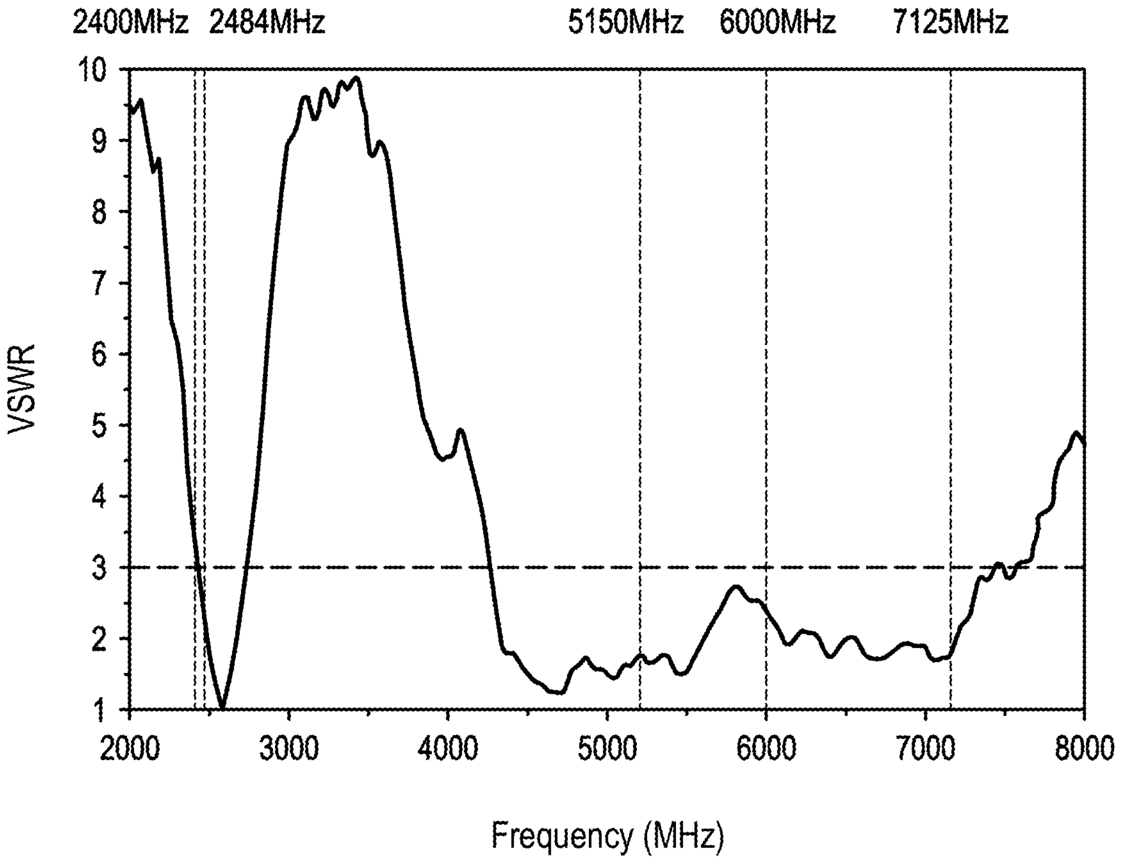
FIG. 4 is a relationship graph of frequency—VSWR of the electronic device in FIG. 1.

FIG. 4 is a relationship graph of frequency-VSWR of the electronic device in FIG. 1. Referring to FIG. 4, a voltage standing wave ratio (VSWR) of the electronic device 100 in the second frequency band (4500 MHz to 5500 MHz) and the third frequency band (6000 MHz to 7000 MHz) is less than 3. In other words, the electronic device 100 of this embodiment has a broad band antenna characteristic of Wi-Fi 6E/7.

Figure 5:
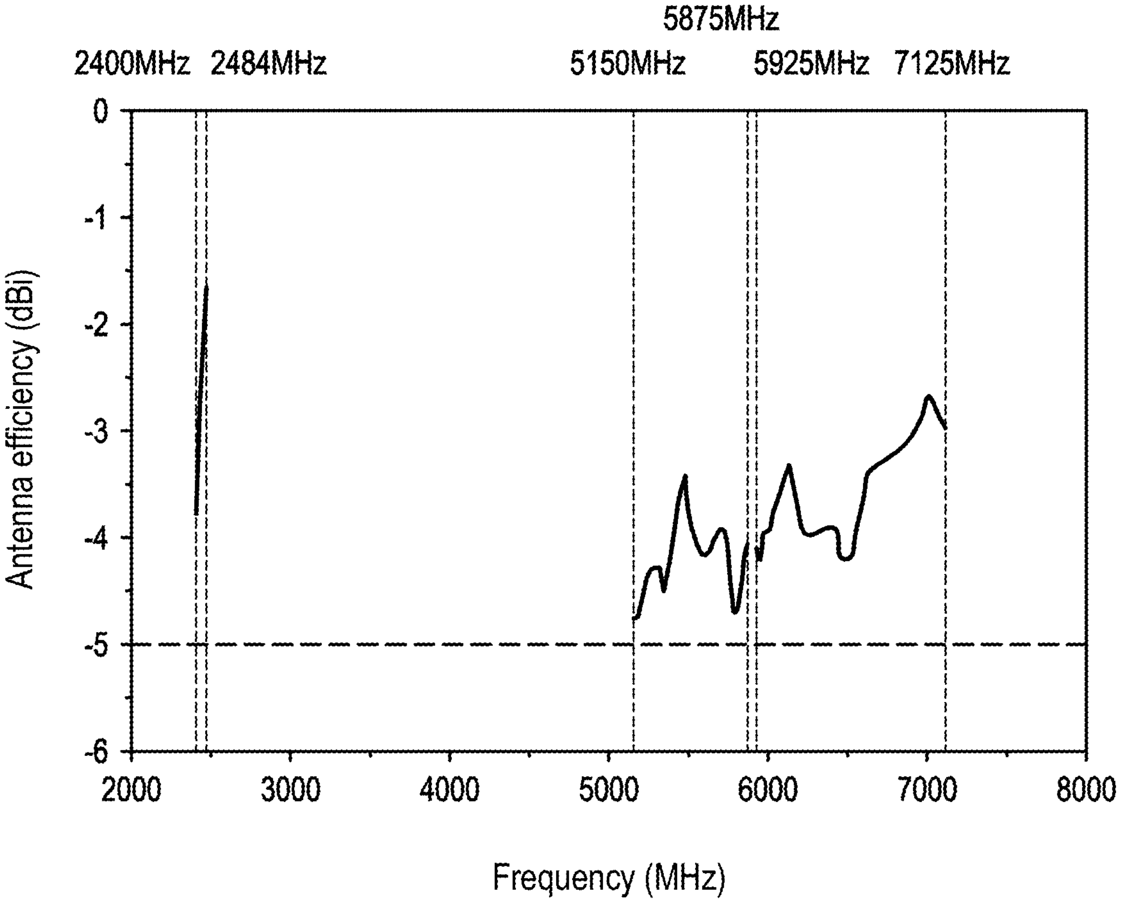
FIG. 5 is a relationship graph of frequency-antenna efficiency of the electronic device in FIG. 1.

FIG. 5 is a relationship graph of frequency-antenna efficiency of the electronic device in FIG. 1. Referring to FIG. 5, the antenna efficiency of the electronic device 100 in the frequency band ranging from 2400 MHz to 2484 MHz (the first frequency band) is between −1.6 dBi and −3.8 dBi, and the antenna efficiency in the frequency band ranging from 5150 MHz to 5875 MHz (the second frequency band) is between −3.4 dBi and −4.7 dBi, and the antenna efficiency in the frequency band ranging from between 5925 MHz and 7125 MHz (the third frequency band) is between −2.6 dBi and −4.2 dBi. In other words, the electronic device 100 of this embodiment has good antenna efficiency in the first frequency band, the second frequency band, and the third frequency band.

Figure 6:
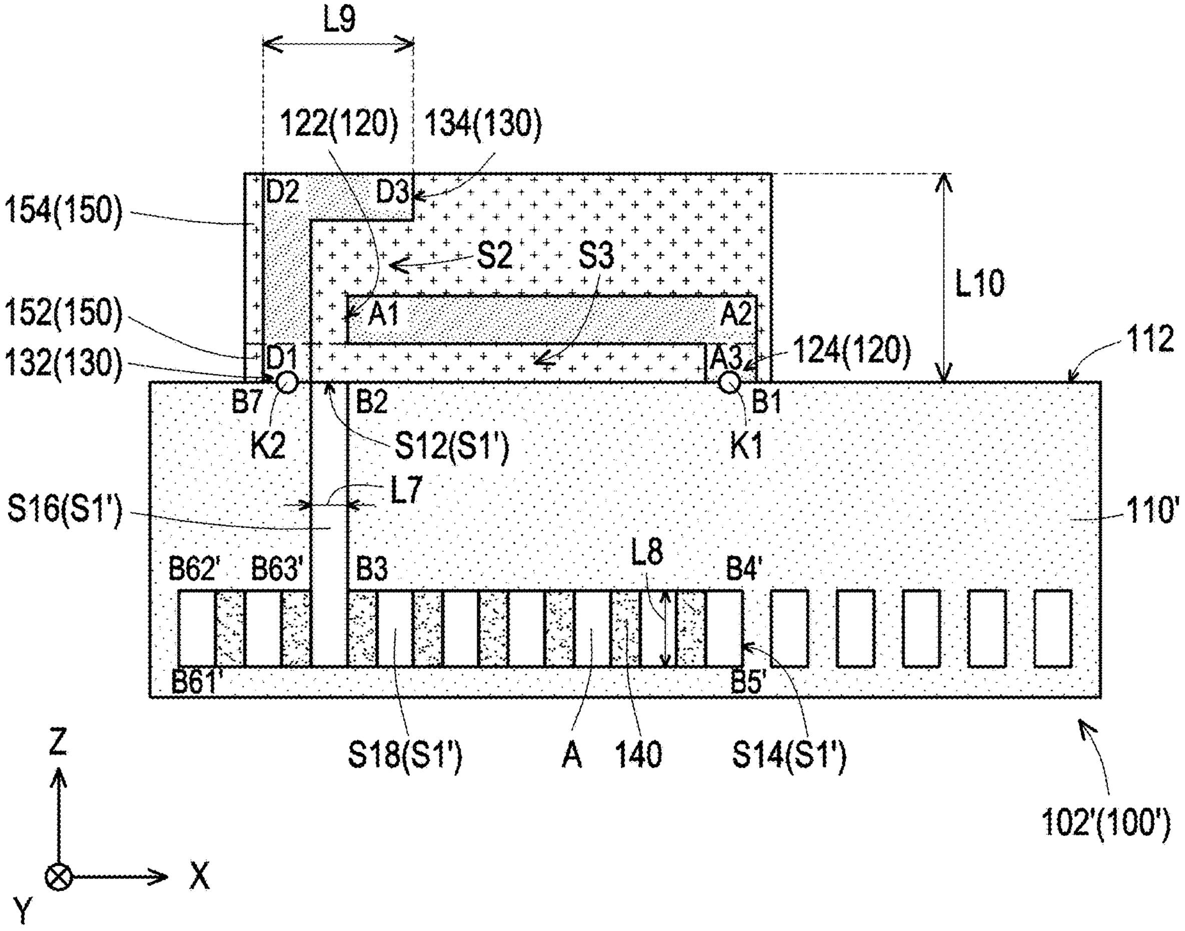
FIG. 6 is a schematic partial view of an electronic device according to another embodiment of the disclosure.

FIG. 6 is a schematic partial view of an electronic device according to another embodiment of the disclosure. Referring to FIG. 6, element configurations and functions of an electronic device 100' and the electronic device 100 in this embodiment are quite the same, so the description of the electronic device 100' is not reiterated here. The difference between the two lies in that a first section S16 of a first slot S1' on a metal side wall 110' is perpendicular to a second section S18, so that the slot S1' is in a T shape.

In this embodiment, the first radiator 120 (the positions A1 to A3 in FIG. 6) of the electronic device 100', the portion (the positions B1 to B2 in FIG. 6) of the upper edge 112 between the second end 124 and the opening end S12, and the portion (the positions B2, B3, B4', B5', B61', B62', B63', and B7 in FIG. 6) of the metal side wall 110' surrounding the first slot S1', and the second radiator 130 (the positions D1 to D3 in FIG. 6) may be used as an antenna module 102' to form an antenna loop path. That is, the disclosure does not limit the shape of the antenna loop path. In addition, the disclosure does not limit the respective lengths of the first section S16 and the second section S18 as long as the total length of the antenna loop path is the same and the air outlet A is not blocked by the circuit board 150.

Figure 7A:
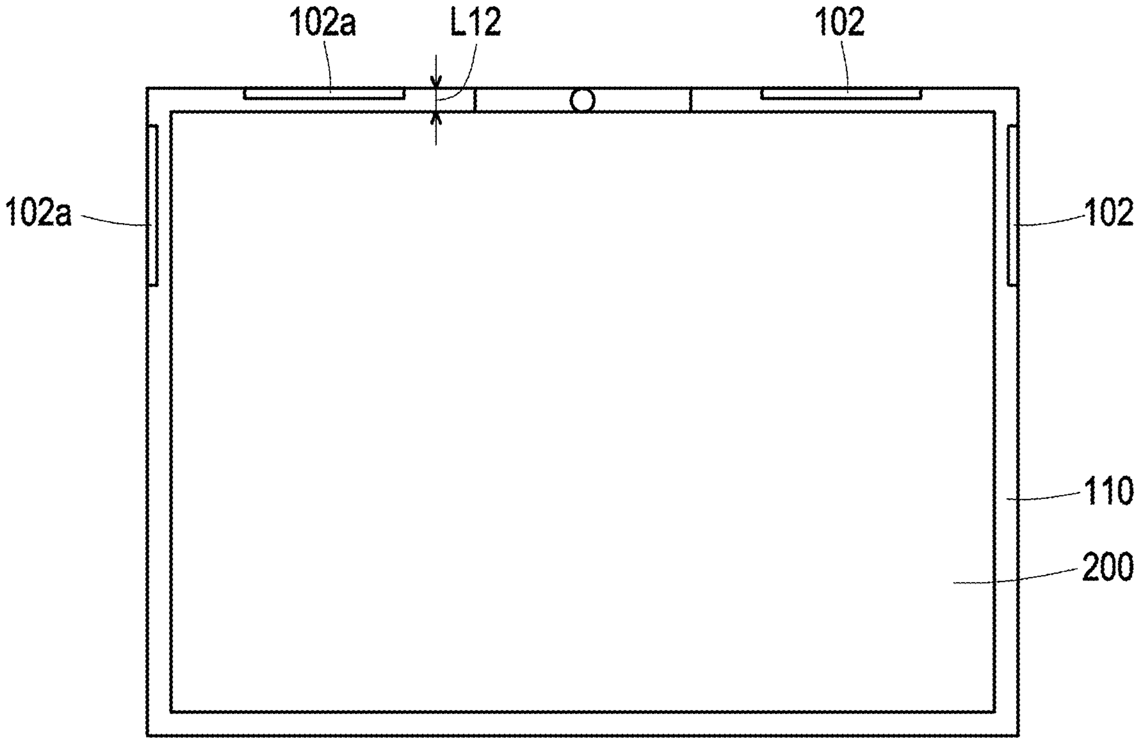
FIG. 7A is a top view of an electronic device according to another embodiment of the disclosure.
Figure 7B:
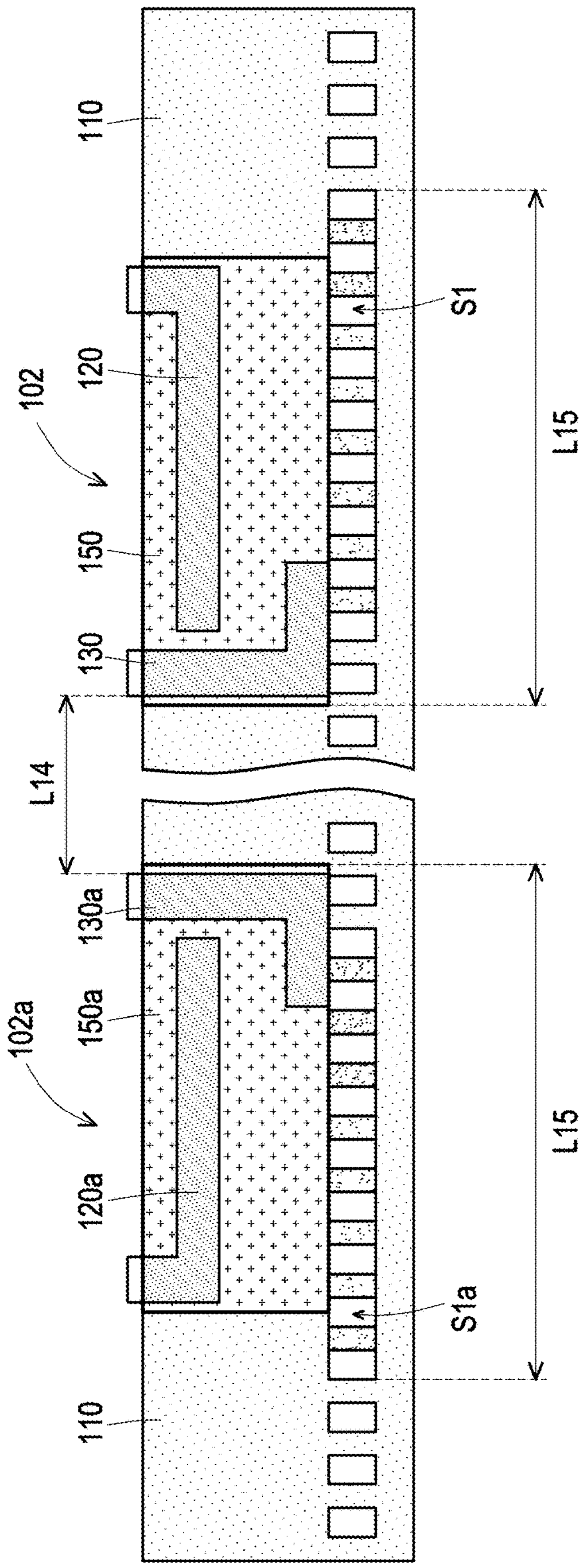
FIG. 7B is a schematic view of two antenna modules in FIG. 7A.

FIG. 7A is a top view of an electronic device according to another embodiment of the disclosure. FIG. 7B is a schematic view of two antenna modules in FIG. 7A. It should be noted that the two antenna modules 102 and 102*a* in FIG. 7B, for example, correspond to the two antenna modules 102 and 102*a* depicted in the top of FIG. 7A.

Referring to FIG. 7A and FIG. 7B, an electronic device 200 (see FIG. 7A) of this embodiment may, for example, have multiple antenna modules 102 and 102*a* to form a multi-input multi-output (MIMO) multi-antenna configuration, so that the electronic device 200 of this embodiment also provides an option of multi-antenna spatial configuration under the narrow frame design.

Specifically, as shown in FIG. 7B, the first radiator 120*a*, the second radiator 130*a*, and the first slot Sla of the antenna module 102*a* are, for example, opposite to the first radiator 120, the second radiator 130, and the first slot S1 of the antenna module 102, and the antenna module 102 and the antenna module 102*a* share the metal side wall 110. That is, the antenna module 102 and the antenna module 102*a* have, for example, the same structure and are arranged symmetrically. Through such a design, a low-frequency path of the antenna module 102 extends in the direction away from the antenna module 102*a*, and a low-frequency path of the antenna module 102*a* extends in the direction away from the antenna module 102, which can prevent the low-frequency bands of the antenna module 102 and the antenna module 102*a* from affecting each other.

In addition, the shortest distance L14 between the antenna module 102 and the antenna module 102*a* in this embodiment (for example, the distance between two circuit boards 150 and 150*a*) is, for example, 10 mm, and lengths L15 of the antenna modules 102 and 102*a* (that is, the lengths of the antenna loop path along the X-axis direction) is, for example, 31 mm.

Please return to FIG. 7A. Although FIG. 7A only shows the two antenna modules 102 and the two antenna modules 102*a*, the disclosure does not limit the number of antenna modules 102 and 102*a*. As long as a sufficient distance is maintained, the mutual interference can be avoided.

Further, the aforementioned MIMO multi-antenna configuration may also be matched with the shapes of metal frames (such as circular, rectangular, or polygonal), and is not limited to the rectangular frame shown in FIG. 7A. In addition, each antenna module 102 and 102*a* has its own independent metal cavity space. By spatial multiplexing communication technology, the capacity of the MIMO multi-antenna configuration increases linearly with the number of antenna modules 102 and 102*a* without increasing the bandwidth and the symmetrical antenna distribution (for example, 2×2 or 4×4), which can provide high communication system capacity and spectrum utilization exponentially.

In summary, the metal side wall of the electronic device of the disclosure has the first slot, and the second end of the first radiator and the third end of the second radiator are connected to the upper edge of the metal side wall. The first radiator, the portion of the upper edge between the second end and the opening end, the portion of the metal side wall surrounding the first slot, and the second radiator form the antenna loop path. The antenna loop path resonates at the first frequency band and the second frequency band. In addition, the second radiator resonates at the third frequency band. Through the aforementioned design, the antenna loop path of the electronic device of the disclosure includes the part of the metal side wall, and can resonate at multiple frequency bands with good performance. These frequency bands include the Wi-Fi 6E/7 frequency band.

In addition, the electronic device of the disclosure can be applied to the narrow frame design, and is less susceptible to assembly tolerances affecting the antenna frequency and the effect. The electronic device of the disclosure has a relatively high metal area, and therefore has better appearance consistency.

What is claimed is:

1. An electronic device, comprising:

a metal side wall, having a first slot, wherein the first slot comprises an opening end and a closed end, the closed end is located on the metal side wall, and the opening end extends to an upper edge of the metal side wall to disconnect the upper edge;

a first radiator, apart from the metal side wall and comprising a first end and a second end, wherein the first end is a feeding end, and the second end is connected to the upper edge of the metal side wall; and a second radiator, apart from the metal side wall and comprising a third end and a fourth end, wherein the third end is connected to the upper edge of the metal side wall, and the opening end of the first slot is located between the second end and the third end, wherein the first radiator, a portion of the upper edge between the second end and the opening end, a portion of the metal side wall surrounding the first slot and the second radiator form an antenna loop path, and the antenna loop path resonates at a first frequency band and a second frequency band.

2. The electronic device according to claim 1, wherein a second slot is formed between a portion of the first radiator near the first end and a portion of the second radiator near the fourth end.

3. The electronic device according to claim 1, wherein a third slot is formed between the first radiator and the upper edge.

4. The electronic device according to claim 1, wherein the antenna loop path is ¾ times a wavelength of the first frequency band.

5. The electronic device according to claim 1, wherein the second radiator resonates at a third frequency band, and a length of the second radiator is ¼ times a wavelength of the third frequency band.

6. The electronic device according to claim 5, wherein the first frequency band is between 2400 MHz and 2484 MHz, the second frequency band is between 4500 MHz and 5500 MHz, and the third frequency band is between 6000 MHz and 7000 MHz.

7. The electronic device according to claim 1, wherein the first slot has a first section and a second section connected to each other, the opening end is located at the first section, the closed end is located at the second section, and a projection of the first radiator or the second radiator onto the metal side wall and the second section of the first slot are staggered.

8. The electronic device according to claim 7, further comprising a plurality of insulating members disposed in the second section at intervals to form a plurality of air outlets.

9. The electronic device according to claim 7, wherein the first section is perpendicular to the second section, so that the first slot is in an L shape or a T shape.

10. The electronic device according to claim 1, further comprising a circuit board, wherein the first radiator and the second radiator are disposed on the circuit board, the circuit board comprises a first part and a second part connected to each other, the first part is connected to the upper edge of the metal side wall, and the second part is located next to the metal side wall and apart from the metal side wall.

* * * * *